United States Patent [19]
Karning et al.

[11] Patent Number: 4,550,408
[45] Date of Patent: Oct. 29, 1985

[54] METHOD AND APPARATUS FOR OPERATING A GAS LASER

[76] Inventors: Heinrich Karning, Albert-Fritz-Str. 6, D-6900 Heidelberg; Franz Prein, Tulpenweg 3, D6901 Waldhilsbach; Karl-Heinz Vierling, Johann-Sebastian-Bach-Str. 46, D-6901 Bammental, all of Fed. Rep. of Germany

[21] Appl. No.: 350,756

[22] Filed: Feb. 22, 1982

[30] Foreign Application Priority Data

Feb. 27, 1981 [EP] European Pat. Off. ........ 81101440.6
Jun. 11, 1981 [DE] Fed. Rep. of Germany ....... 3123049

[51] Int. Cl.[4] ................................. H01S 3/22
[52] U.S. Cl. ........................................ 372/58; 372/61;
372/87; 372/37; 372/64; 372/55; 372/33
[58] Field of Search .................. 372/58, 87, 61, 34,
372/37, 88, 64, 33, 55, 59

[56] References Cited

U.S. PATENT DOCUMENTS

| | | | |
|---|---|---|---|
| 3,451,052 | 9/1982 | Sasaki et al. | 372/58 |
| 3,970,957 | 7/1976 | Regan | 372/59 |
| 4,158,821 | 6/1979 | Bresman | 372/88 |
| 4,283,686 | 8/1981 | Dougherty et al. | 372/58 |
| 4,307,350 | 12/1981 | Faray et al. | 372/58 |
| 4,414,670 | 11/1983 | Limpaecher | 372/58 |

*Primary Examiner*—William L. Sikes
*Assistant Examiner*—Léon Scott, Jr.
*Attorney, Agent, or Firm*—Handal & Morofsky

[57] ABSTRACT

Methods and apparatuses for operating a gas laser which utilize the electrical discharge between the electrodes to increase gas circulation. In a first embodiment, electrical discharges cause a control current (pulse) which activates an electromechanical device disposed within a closed gas flow loop. The electromechanical device acts as a pump and effects gas exchange and heat dissipation with a minimum of elements. In other embodiments, electrical discharges cause pressure fluctuations which increase gas circulation without the use of mechanically moved parts. To this end, connecting lines that determine the direction of the flow are placed between the chambers in order to facilitate equalization of gas pressure. A flow circulation loop is thereby created in a quasi-passive manner when suitably constructed.

16 Claims, 18 Drawing Figures

METHOD AND APPARATUS FOR OPERATING A GAS LASER

TECHNICAL FIELD

The invention relates to methods and apparatuses for operating a gas laser in continuous wave (CW), radio frequency (RF), or pulsed mode. Electrical discharges are produced in the laser via a high-voltage supply. In a first embodiment electrical discharges cause a control current (pulse) which increases gas circulation by activating a mechanical means. In the other embodiments the electrical discharges cause a pressure fluctuation which increases gas circulation without mechanically moved parts.

BACKGROUND ART

A method and apparatus of the type of the first embodiment are the subject of the European patent application No. 81 101440.6. That system includes a sealed-off discharge chamber that has flow channels, nozzles, valves, diaphragms, and the like so that each of the pressure or temperature changes occurring during an electrical discharge triggers a cycle of a circuit in a direction which is determined by the mechanical means.

An apparatus that uses pressure fluctuations to circulate gas is the subject, among others, of the DE Offenlegungsschrift No. 27 53 304. However, in this otherwise quite practical system, the gas escapes in the same amount through the right and left recesses of the discharge chamber during an electrical discharge. The gas flow is brought about separately by a gas transporter disposed in the second adjacent chamber or a given direction is impressed on the moving gas molecules.

SUMMARY OF THE INVENTION

The basis of the invention is the problem of improving the gas exchange and the heat transport from lasers of the type described above. This problem is solved, according to the first embodiment, in that the current pulse which occurs during the electrical discharge actuates an electromechanical device which is disposed within or without the housing but within the gas flow circuit and which acts as a pump. In this manner, the invention makes use of the gas flow as a variable already present within the laser so that no additional energy is necessary. The electromechanical device may be actuated by a rotatry pulse generated by the current or by an electromagnetically triggered reciprocal motion.

A further development of the invention provides for a first chamber integrated within the housing and serving as the discharge chamber, and this chamber may be connected, if necessary, with one or several further chambers serving as gas reservoirs and disposed within the same housing or distributed over several housings. This housing or system of housings has two external ports communicating via the electromechanical device. One of the ports suitably lies on the optical axis of one endface of the housing, while the other port lies in the central region of its substantially cylindrical longitudinal wall. The device itself is disposed directly behind one of the ports.

The electromechanical device may, advantageously, have the form of a pump, a magnet within a coil in the sense of an electric motor or an electromagnetic vibrator, a deformable (shortenable) conductor and/or a diaphragm assembly. It is also possible for the pump to be connected to another pump operated within the closed loop.

It may also be advantageous for the device in the form of a deformable conductor to have an extended shape in which one wall of the gas reservoir chamber is deformed and causes gas to be pumped from this chamber.

Again, it may be advantageous if the device in the form of a diaphragm assembly is integrated with a tube of small diameter serving as a gas and current conductor and having an annular opening, this tube being connected to a bellows-like portion which alternately contracts and expands or to a member that alternately narrows and widens. The former port may be provided with a blocking mechanism, such as a diaphragm, a valve, a nozzle, a system of holes, or the like, activatable by the pumping effect.

A further characteristic of the invention provides that one port is disposed on the optical axis of one endface of the housing, the other port is disposed in the substantially cylindrical longitudinal wall of the housing, while the electromagnetic device is disposed directly behind one of these ports.

As the industrial world nowadays requires especially compact lasers, the use of the transporters, pumps, fans, or the like represents an unnecessary use of space. A further difficulty of this method is the high degree of purity necessary in closed systems. Such a requirement cannot be adequately met when devices with movable parts including bearings and lubricants are employed. Moreover, the lifetime of movable parts, especially those present in closed systems, where they cannot be adequately maintained, is limited.

One object of the invention most clearly illustrated in said other embodiments is to provide for directional gas transport in a laser and to do so in a passive manner.

This object is attained, according to the invention, in that a cycle of a gas flow circulation is initiated upon the occurrence of each peak value of a pressure or temperature fluctuation by means of devices that are disposed in the housing for causing a directional effect. A quasi-passive method of this kind requires no moving parts and thus has long life and is especially suitable for so-called sealed-off operation, i.e., for lasers in completely closed-off systems.

A preferred embodiment of the principle of the invention provides that the peak value is generated in one of at least two connected chambers of the same housing or of several housing units. A further significant feature is that each pressure and/or temperature fluctuation causes a volumetric gas equalization with slightly reduced pressure in the discharge chamber, through an open or opening connection line between the chambers. This event blocks the return passage through the connecting line and releases another, previously closed, connecting path for returning the gas into the discharge chamber. The direction of the gas circulation can also be predetermined with the aid of a directional flow resistance.

The above-described method works with any electrically excited gas laser, i.e., a CW-laser operated with DC current, or a CW or pulsed laser operated with radio frequency or high-frequency excitation, or even a laser operated with pulsed high voltage. However, in practice, it has been found most sensible to embody the excitation system as a system of electrodes that discharges along or transverse to the main axis of the laser with extended or folded beam path or to embody it as a discharge chamber equipped with a capacitive or inductive radio frequency injector. The pressure and/or temperature peaks depend on the energy and/or the geometry of the chambers and/or their material.

A further development of the invention provides that one or more of the chambers are integrated within one housing or that at least two chambers are distributed over two or more housing units that are installed with or without separation from one another and form a completely closed system except for the voltage supply and the inlet and outlet for the laser beam, the chambers being coupled via two conduits that permit passage in opposite directions. Suitably, the connecting conduits are flow channels, tubes, nozzles, valves, diaphragms, systems of holes, heat pipes, or combinations thereof.

In order to carry away the waste energy occurring in almost all lasers and amounting to from 80 to almost 100% of the input energy, reliable long-term operation of the laser, especially a high-powered laser or a laser with a high cycle rate, requires rapid gas exchange and good cooling. From this point of view, it is advantageous to make the inside surface of the second chamber as large as possible, e.g. as a meandering profile and/or with cooling fins extending longitudinally. A further significant feature may be that one or both chambers, or the right and left half of one or both chambers, are made of material having a different coefficient of thermal conduction or that at least one chamber is provided with a heater or a heated catalyst. A numerical example of the effect of such steps is as follows. A laser with a discharge volume of approximately 20 cm$^3$ which is pumped with, for example, 3 joules of energy, can be operated at a pulse frequency of 2 to 3 Hz., whereas, with the use of gas transport, the pulse frequency can be increased several-fold. If it is necessary to increase either the energy or the pulse frequency, then devices such as those described here are indispensable.

During the laser process described above, products of the dissociation of $CO_2$ and $N_2$ are created. In order to return these gases to the original composition, it is advantageous to cover the inner surfaces of the second chamber with a catalyst and/or to fill the volume of that chamber with catalyst. The catalyst may consist, for example, of platinum or a manganese dioxide-copper oxydul compound.

For the purpose of gas cleaning, another feature of the invention provides that, for example, an electrostatic filter, cooling traps and/or electric filters are disposed in the gas flow.

BRIEF DESCRIPTION OF DRAWINGS

Several embodiments of the invention will now be described in detail with the aid of drawings in which corresponding parts carry the same reference characters.

DETAILED DESCRIPTION OF THE PREFERRED EMBODIMENTS

Figure 1:
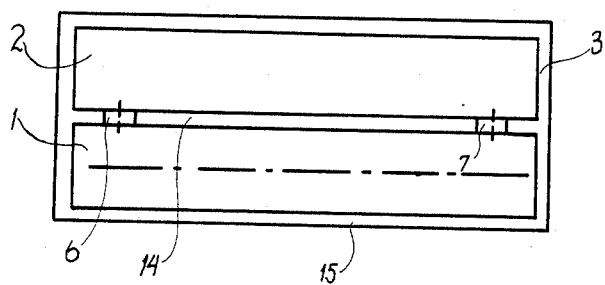
FIG. 1 is an embodiment with common housing for the discharge and gas reservoir chambers and connecting lines therebetween, in an axial section.
Figure 2:
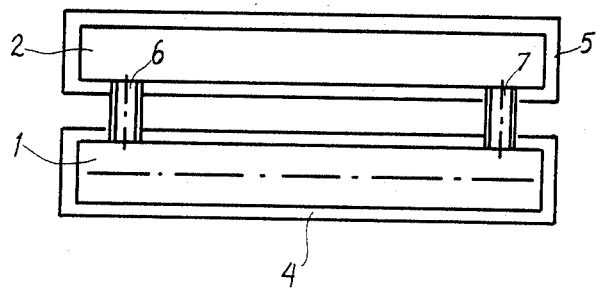
FIG. 2 shows the embodiment of FIG. 1 in which each chamber is surrounded by a separate housing.

In FIGS. 1 and 2 the discharge chamber 1 is part of an electrically discharging gas laser which may be excited, as desired, either transversely or longitudinally, and which may operate in CW, RF, or pulsed mode, and the adjacent chamber 2 serves as gas reservoir. In the case of FIG. 1, both chambers are integrated into the same housing 3 whereas, in the case of FIG. 2, each of the chambers is surrounded by a separate housing 4 or 5, respectively. The two chambers may be disposed adjacent to one another with or without spacing.

Figure 3:
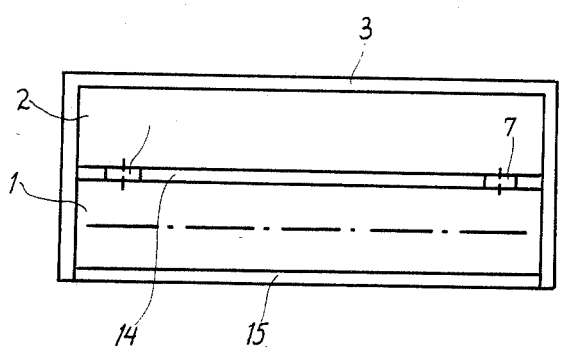
FIG. 3 shows a device as in FIG. 1 with a radio-frequency source between two metal or dielectric electrodes constituting the walls of the housing.
Figure 4:
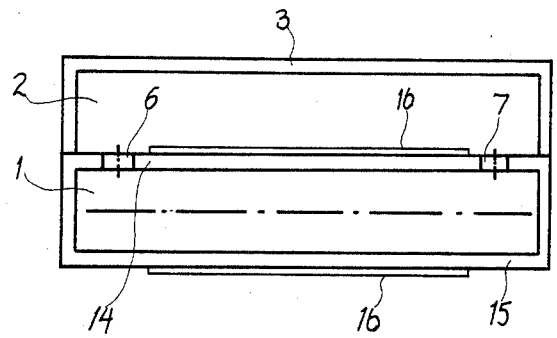
FIG. 4 shows an embodiment as in FIG. 3 with capacitive radio-frequency insertion.
Figure 5:
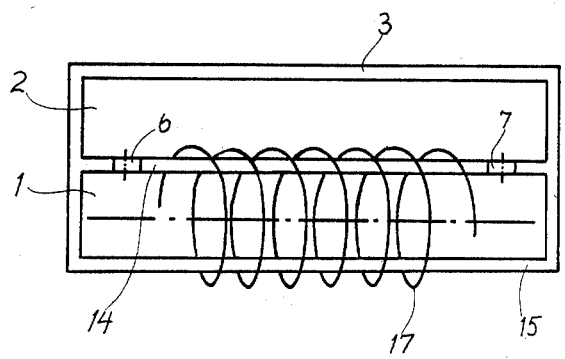
FIG. 5 shows an embodiment as in FIG. 4 with inductive radio-frequency coupling.

The construction of the embodiment of FIG. 3 is similar to that of FIG. 1 except for the material of the wall 14 separating the two chambers and of the opposite outer wall 15. These walls are made of metal and serve as electrodes and are supplied with radio frequency or high-frequency power. The embodiments of FIGS. 4 and 5 differ therefrom only in that in the former, both walls 14 and 15 consist of a dielectric medium covered externally with an electrical conductor 16 and excited by a capacitive radio frequency signal insertion, although pulsed excitation is also possible. In the embodiment of FIG. 5, the walls are surrounded by the coil 17 for inductive radio frequency coupling.

Figure 9:
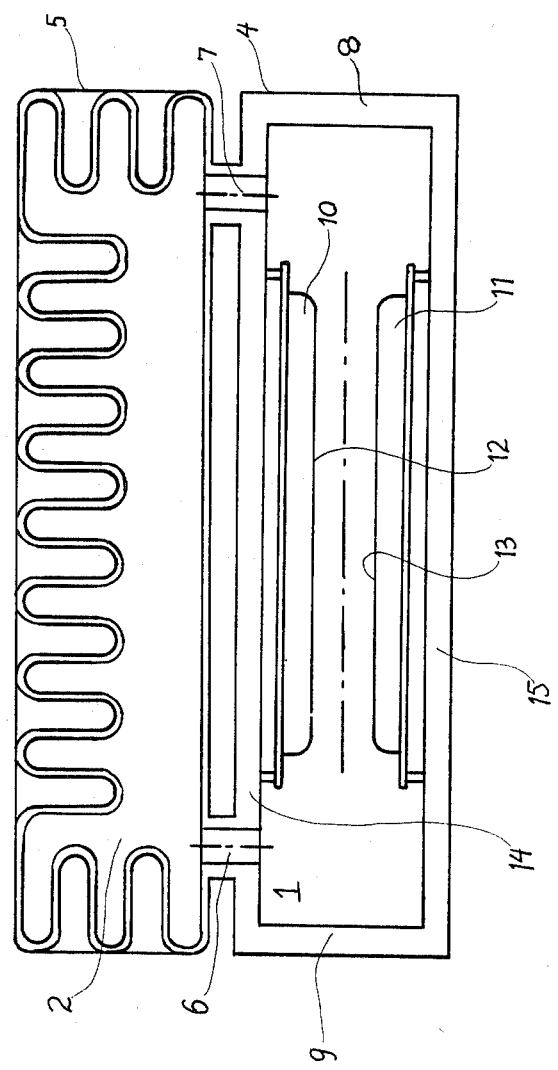
FIG. 9 shows an apparatus representing substantially a combination of FIGS. 1 and 6 with a meandering inner surface of the second chamber.
Figure 10:
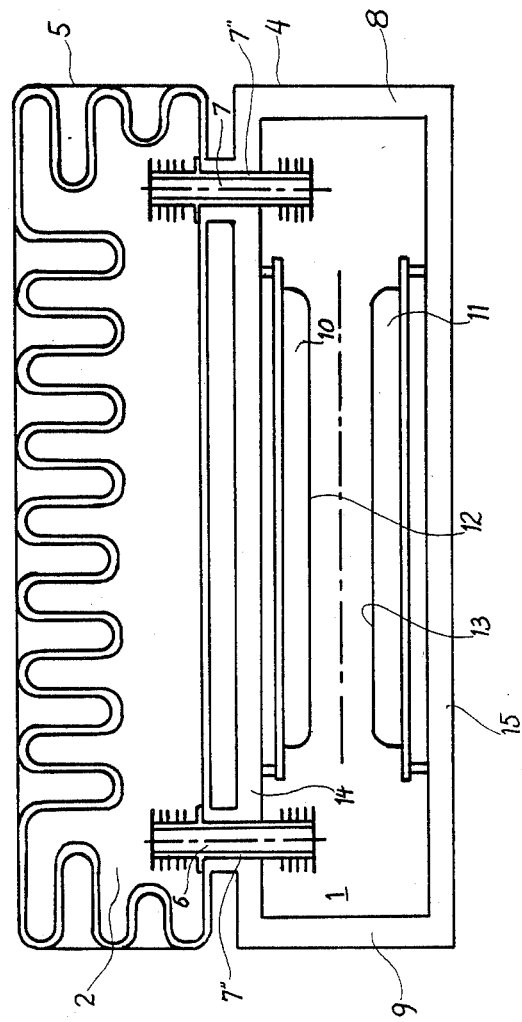
FIG. 10 shows an apparatus as in FIG. 9 with heat pipes as connecting lines.
Figure 11:
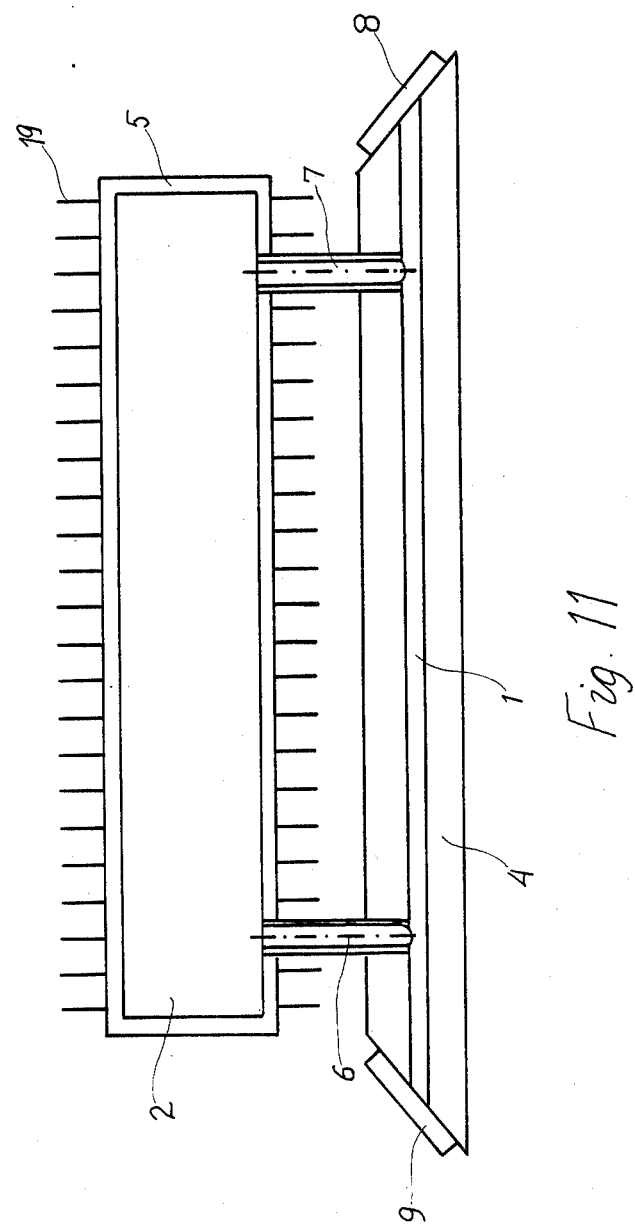
FIG. 11 shows an apparatus substantially as shown in FIGS. 2, 9, or 10 with Brewster-angle windows in the discharge chamber and external cooling fins on the other chamber.
Figure 12:
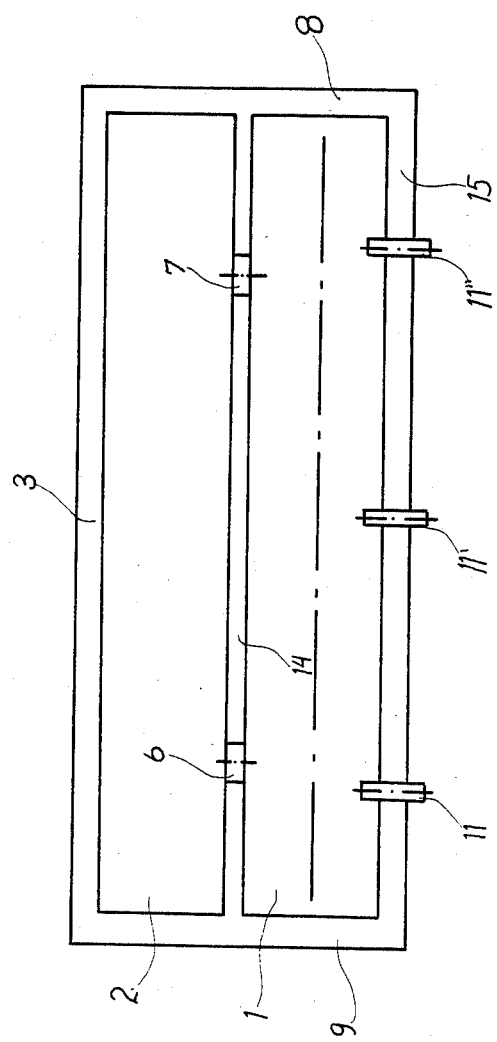
FIG. 12 shows an apparatus substantially as shown in FIG. 6 with a system of electrodes extending along the main axis.
Figure 13:
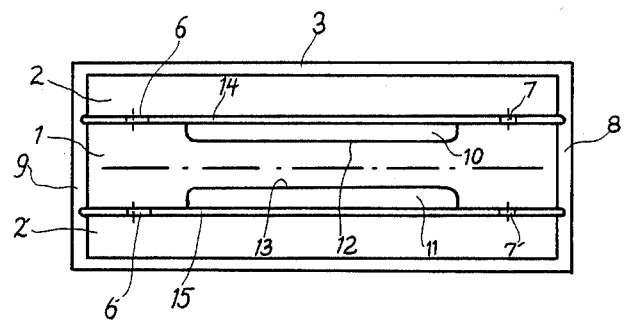
FIG. 13 shows an apparatus substantially as in FIGS. 6-8 with two gas-reservoir equalization chambers.
Figure 14:
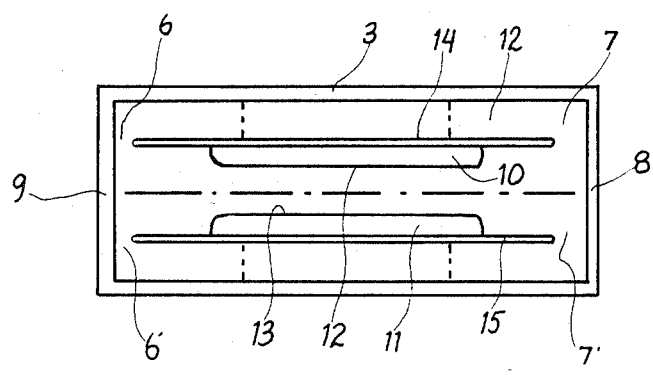
FIG. 14 illustrates the most general form of the invention with only a single housing and a single chamber.

The embodiments of FIGS. 6-14 illustrate known electrode systems which are shown with an extended beam path for simplification. However, other embodiments, not shown, having electrode configurations with folded beam paths are also conceivable without departing from the frame of the invention. The examples depicted in FIGS. 6–10, 13, and 14 show axially extended electrode systems 10–13, each with electrodes 10 and 11 and opposing discharge surfaces 12, 13, respectively, and defining an elongated beam path. The electrodes are attached to or integrated with the opposing long walls 14 and 15 of the discharge chamber 1. The reflecting and (partially) transmitting optical elements, which would be attached to, or be part of, the inside of the walls 8 and 9 in the free space between the electrodes, and the high-voltage supply, which are known, have not been shown in the drawing. The optically transmissive elements can also be Brewster-angle windows, as shown in FIG. 11. FIG. 12 shows the feature that the electrodes 11, 11' and 11" are placed in the wall 15 transverse to the axis of the housing 5. The discharge takes place in the direction of the axis. If additional electrodes are located in the opposite wall 14 (not shown in the drawing for simplicity), the beam path is again folded and such a construction is included in the concept of the invention. FIG. 13 illustrates the possibility of providing a second chamber 2' as a gas reservoir in addition to the chamber 2. Also conceivable are several of such chambers or even a single chamber as shown in FIG. 14 to represent the most general embodiment of the invention, the direction of gas flow being indicated by differently configured lines 6, 6', 7, and 7'. In this figure, the dashed lines indicate the electrode holders, mounted, for example, at the top and bottom of the chamber. The longitudinal walls 14, 15 have been reduced here to mere electrode covers. As a variant of this embodiment, one or more chambers can be located in various housings.

Figure 6:
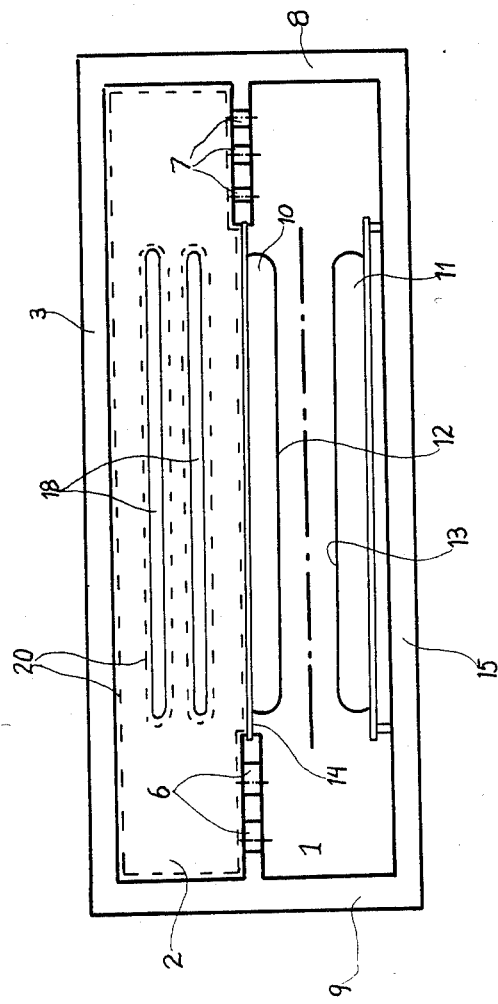
FIG. 6 shows an apparatus substantially as in FIG. 1 with a system of electrodes excited transversely to the main axis.
Figure 7:
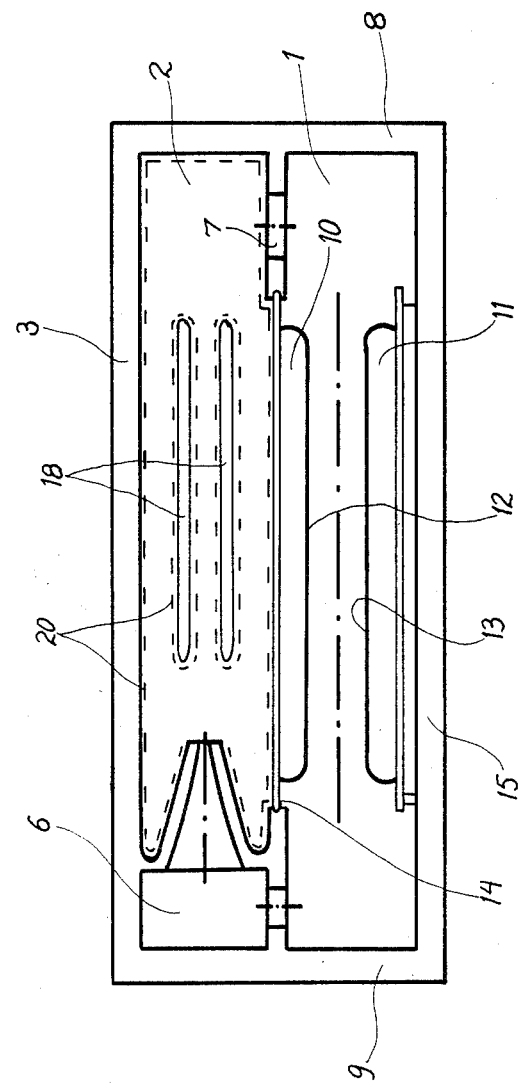
FIG. 7 shows an apparatus substantially as in FIG. 6 with a connecting line that becomes a flow channel on the reservoir side.
Figure 8:
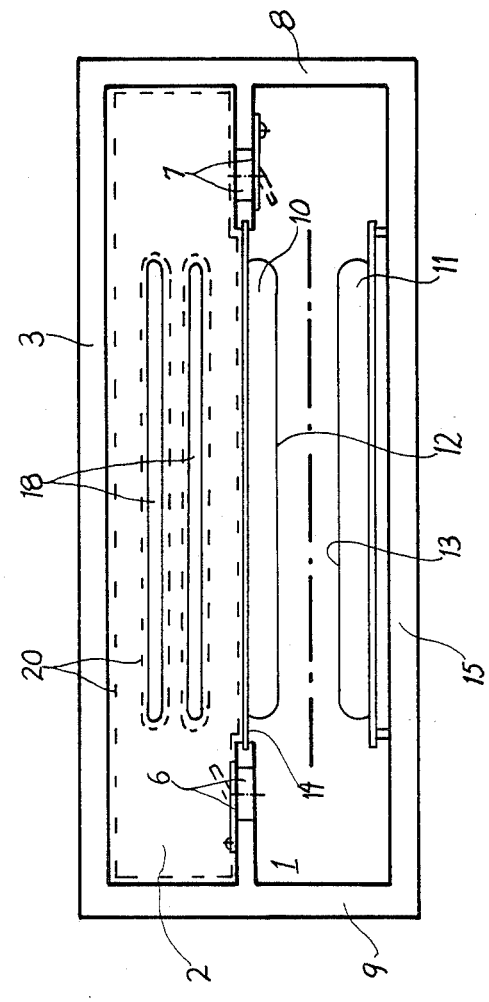
FIG. 8 shows an apparatus substantially as in FIG. 6 with a diaphragm that covers the connecting lines or releases them as needed.

The end regions of both chambers in all embodiments are connected together by respective lines 6 and 7. The form of these connecting lines can be very different for adaptation to special conditions. For example, the embodiment with two housings suitably uses tubular connecting lines, for example, as shown in FIGS. 2, 9, and 11. Systems of holes as in FIG. 6, diaphragms as in FIG. 8, or so-called heat pipes as in FIG. 10, and simple wall openings as in FIGS. 1, 3–5, and 12 are more suitable for the embodiments with a single housing. One position of the diaphragm in FIG. 8 is shown by solid lines, indicating the closure of the system of holes. In the other position, shown by dashed lines, the system of holes is open to permit the passage of gas. The heat pipes in FIG. 10 are double-walled tubes and the enclosed space 7" is filled with gas. Laser gas flows through the tube and condenses on the outside, whereafter it is returned to the tube in the cooled, liquid state. Mixed constructions, for example, as in FIG. 7, are also possible, where a nozzle or a flow channel is located on the left side as seen in the drawing and a hole is located on the other side. Another hybrid form is seen in FIG. 6, in which one side of the wall 14 is perforated by two holes and the other side by three holes. The different numbers or sizes of the lines causes different flow resistances in the two directions, thereby causing a preferred direction of flow through the chambers. When a pumping process or a population inversion takes place, the electrical discharge causes a change of the pressure, and to a lesser degree, a change of the temperature, in the chamber 1, depending on the supplied energy and/or the geometry of the chambers and/or the material of the chambers. Both the temperature changes and, especially, the pressure peaks, which can amount to several hundred torr, can be used to generate gas transport under the above-described conditions. In this process, the line 7 is initially closed as shown especially well, for example, by the different operating positions of the diaphragm. When the pressure in the chamber is increased, the diaphragm, which opens only inwardly, cannot be opened but is pressed even more tightly against the wall 14. The diaphragm 6 opens only toward the inside of the chamber 2 and is also closed initially. However, it opens when the pressure in chamber 1 increases, i.e., it moves from the solid-line position into the dashed-line position and permits gas to pass until the pressure is equalized in both chambers. The equalized pressure and a slightly reduced pressure occurring in the chamber 1 permit the diaphragm 6 to return to its initial position shown by solid lines and open the diaphragm 7 at the same time, i.e., cause a displacement thereof from the solid-line position into the dashed-line position, permitting gas to flow back to the discharge chamber 1. This principle applies basically to all of the variants shown in FIGS. 6–14 although the direction of the gas flow can be predetermined by different cross sections of the two lines 6 and 7 (FIG. 6) or suitably formed nozzles or flow channels (FIG. 7) instead of closing and opening lines. Various aids, for example accelerated cooling of the gas heated by the sudden pressure rise, have a favorable effect on the gas transport. This includes, among others, an increase of the inside surface area of chamber 2, which may be achieved, for example, by a meandering form for this inside surface (FIGS. 9 and 10) and/or by the placement of cooling fins 18 or 19 (FIGS. 6–8 and 11). When interior cooling fins 18, as in the variants of FIGS. 6 and 8, are provided, they are disposed to extend in the direction of the gas flow, while external cooling fins may also run transversely to the direction of gas transport. Both chambers or their right and left halves, as seen in the drawing, can be provided with different thermal insulation or constructed of materials with different thermal characteristics, either additionally or alternatively, which also contributes to the acceleration of the gas flow. Still another possibility for influencing this process consists in providing a heater in at least one of the chambers.

FIGS. 6–8 indicate that the surfaces of the chamber 2 are coated with a catalyst 20 of, for example, platinum or a manganese dioxide-copper oxydul compound and in another embodiment, not shown, such a catalyst may, in addition or alternatively, fill the entire volume of this chamber.

Figure 15:
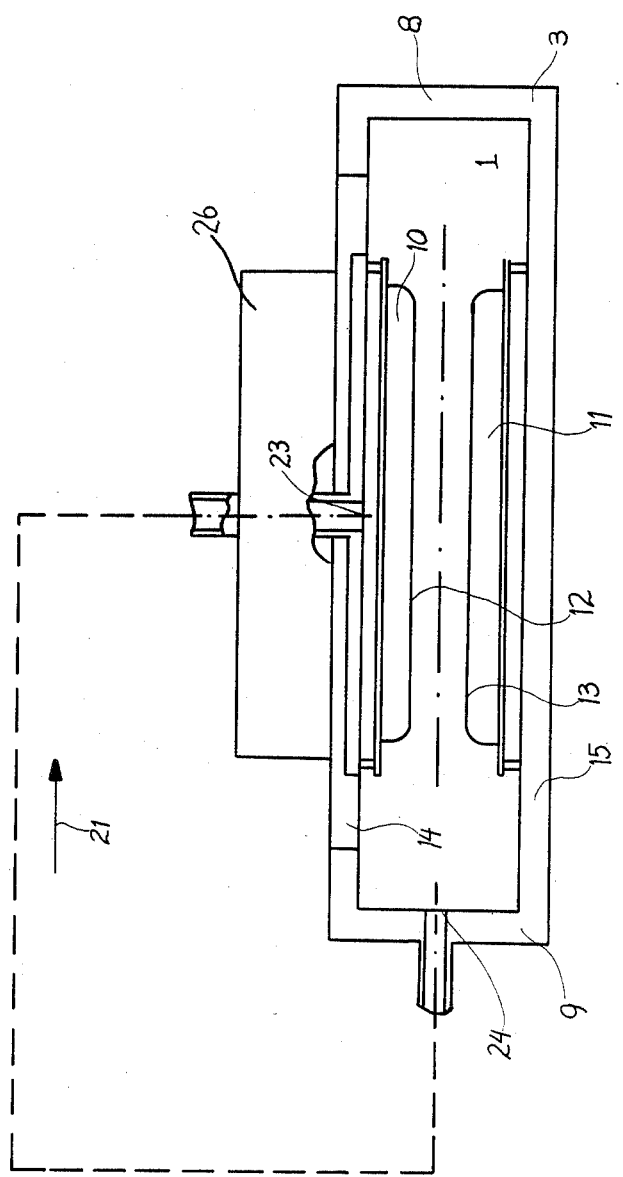
FIG. 15 shows the discharge chamber of a gas laser with two ports opening to the outside and communicating with one another and with an electromagnet vibrator or electric motor in the junction line.
Figure 16:
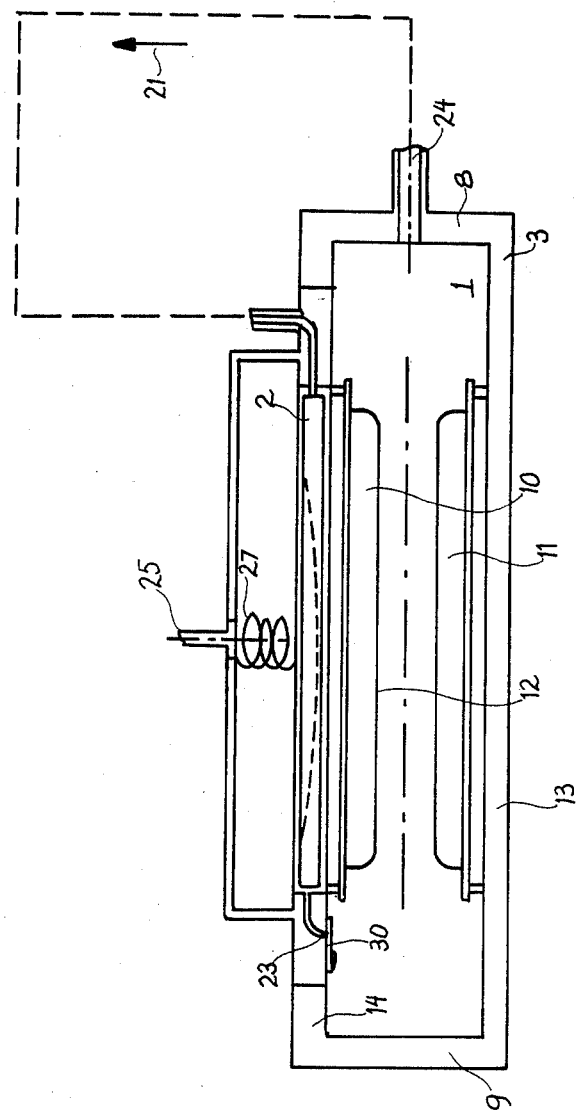
FIG. 16 shows the discharge chamber according to FIG. 15 in which a deformable conductor is disposed in the junction line.
Figure 17:
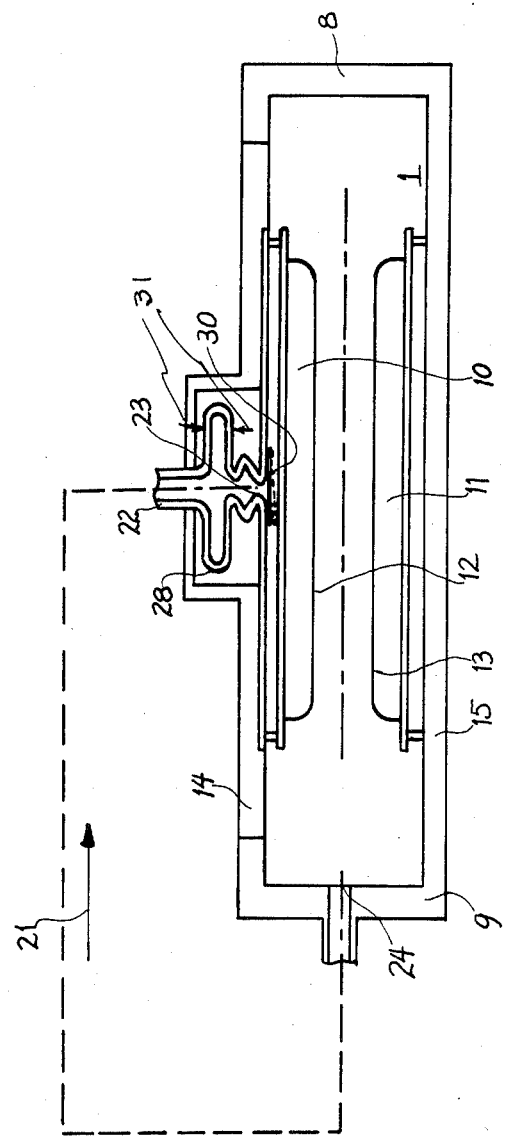
FIG. 17 shows the discharge chamber according to FIG. 15 in which a diaphragm system is disposed in the junction line.
Figure 18:
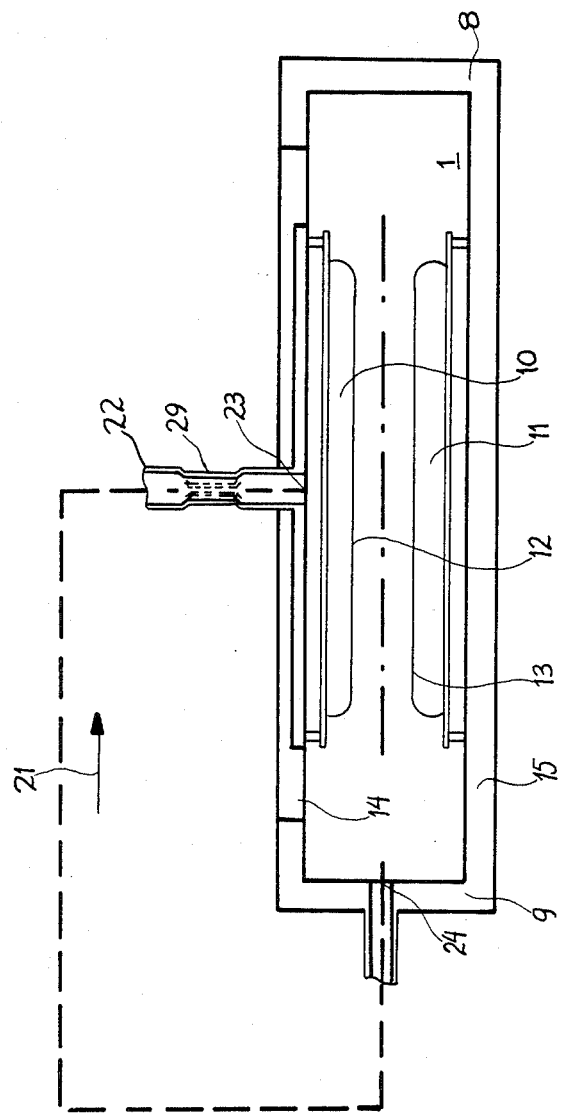
FIG. 18 shows the discharge chamber according to FIG. 15 in which the junction line is embodied as a current conductor and is provided with a pump diaphragm.

In the cases of FIGS. 15, 17, and 18, the housing 3 includes only a single chamber whereas, in the case of FIG. 16, the upper region of the housing also includes a second chamber 2 serving as a gas reservoir and sharing a common side wall 14 with the discharge chamber. In another embodiment, not shown in the drawing, the two chambers may belong to two different housings with or without separation. The electrode systems illustrated in FIGS. 15–18 are similar to those of FIGS. 6–14, and the reference number system has been retained. High voltage is supplied via the port 23, except in the embodiment of FIG. 16 in which a separate high-voltage supply 25 is shown. The principle of the invention is unaffected by whether the beam path is elongated or has some other profile, or whether the electrodes 10 and 11 have a Rogowski profile or some other profile, or whether they consist of simple wires, bridges, points, or combinations thereof.

Attached to the housing in the vicinity of the port 23 is an electromechanical device 26–29, which, in the embodiment of FIG. 15, consists of a magnet surrounded by a coil in the manner of an electromagnet, e.g., a stepping motor or a linear motor. This device is actuated by the control current which occurs during the discharge and which may cause a rotary moment or a reciprocal motion, in such a way as to act as a pump or to drive another pump which would be disposed within the gas flow loop 21 indicated by the dashed line. The gas flow loop connects ports 23 and 24.

The embodiments of FIGS. 17 and 18 differ from the embodiment of FIG. 15 only in that the motor or vibrator is replaced by a diaphragm system. In the case of the embodiment of FIG. 17, a bellows 28 is attached by one end directly to the port 23 of the housing 3 and by its other end to the tube 22 of the predetermined gas flow loop 21. The actual exit includes a diaphragm 30, the closed position of which is shown by solid lines and the open position of which is shown by dashed lines. During an electrical discharge, the control current (pulse) causes the bellows to contract in the direction of the arrows 31, so that the resulting pumping effect alternately opens and closes the diaphragm 30, which, in the other embodiments, may be a valve, a nozzle, a system of holes, or the like. The direction of the resulting gas flow is indicated by the arrow 21.

In the embodiment of FIG. 18, the exit port 23 of the housing 3 is directly connected to the tube 22, whose metal sleeve acts as a current conductor. The tube 22 has a relatively small diameter and includes an annular region containing a diaphragm 29 which narrows or completely closes the inside cross section of the tube in its normal position, but which enlarges or opens it during an electrical discharge.

The embodiment of FIG. 16 differs from the other embodiments, especially because of the presence of the two-chamber system. The deformable (shortenable) conductor 27, which may, for example, be helical, is fixedly clamped between the longitudinal wall 14, which is very thin in this area, and a stable holder of the housing 3. The deformable conductor is so constructed as to extend during an electrical discharge, thereby pushing in the thin longitudinal wall as shown by the dashed lines in that area. The exit port 23 of the chamber 1 communicates with the chamber 2 via a channel that may be blocked by the diaphragm 30 so that, during the above-described pumping action, the diaphragm becomes passable, causing a gas flow to be generated in the direction of the arrow 21 in this case also.

We claim:
1. A fluid laser system, comprising:
   (a) discharge chamber means for defining an interior volume having first and second ports positioned at opposing ends of said discharge chamber means, said ports communicating with said interior volume;
   (b) first and second reflective members positioned at said opposing ends of said discharge chamber means and defining a resonant cavity with an optical axis;
   (c) reservoir chamber means for defining an interior volume having third and fourth ports positioned at opposing ends of said reservoir chamber means, said ports communicating with said interior volume;
   (d) first channel means extending between said first port and said fourth port for putting said discharge chamber means in communication with said reservoir chamber means;
   (e) second channel means extending between said second port and said third port for putting said discharge chamber means in communication with said reservoir chamber means;
   (f) an active fluid disposed throughout said discharge chamber means, said reservoir chamber means and said first and second channel means;
   (g) excitation means coupled to said active fluid for exciting said active fluid to emit laser energy;
   (h) first valve means for permitting flow of said fluid in said first channel means only in a direction from said discharge chamber means to said reservoir chamber means; and
   (i) second valve means associated with said second channel means for permitting flow of said fluid only in a direction from said reservoir chamber means to said discharge chamber means.

2. A fluid laser system as recited in claim 1, wherein said discharge chamber means and said reservoir chamber means are formed from a single housing member.

3. A fluid laser system as recited in claim 1, wherein said reservoir chamber means further comprises additional interior volumes.

4. A fluid laser system as recited in claim 1, wherein said discharge chamber means is positioned in a larger reservoir chamber, and said interior volume of said larger reservoir chamber means is defined by opposing walls of said discharge chamber means and opposing electrodes of said excitation means that are positioned substantially parallel to said optical axis and displaced from said opposing walls.

5. A fluid laser system as recited in claim 1, wherein said reservoir chamber means has a metallic circuitous inside surface for cooling said active fluid.

6. A fluid laser system as recited in claim 1, wherein said reservoir chamber means has metallic cooling fins disposed inside said interior volume and positioned substantially parallel to the direction of flow of said active fluid.

7. A fluid laser system as recited in claim 1, wherein said reservoir chamber means and said discharge chamber means each have inside surfaces; and a material having a first coefficient of thermal conduction extends over half of the insider surface of said reservoir chamber means and half of the inside surface of said discharge chamber means; and a material having a second coefficient of thermal conduction extends over the remaining halves of said inside surfaces of said reservoir chamber means and said discharge chamber means.

8. A fluid laser system as recited in claim 1, wherein said reservoir chamber means has a heated catalyst coating disposed on its inside surface.

9. A fluid laser system as recited in claim 1, wherein said first and second channel means and said reservoir chamber means define a return flow path for said active fluid, and further comprising filter means for cleaning said active fluid, said filter means being disposed in said return flow path of said active fluid.

10. A gas laser system, comprising:
   (a) discharge chamber means for defining an interior volume haing an optical axis and first and second ports;
   (b) first and second reflective members forming an optical resonant cavity;

(c) a channel member extending between said first port and second port for containing an active fluid and providing a circulation path for said fluid;

(d) said active fluid is disposed throughout said discharge chamber means and said channel member;

(e) an excitation system comprising an electrode system and a high voltage supply coupled thereto; and (f) an electromechanical pumping means associated with said second port and said channel means for pumping said active fluid from said discharge chamber means through said first port, said channel means and said second port; said pumping means being powered by a current pulse produced by the laser discharge.

11. A fluid laser system as recited in claim 10, wherein said electromechanical pumping means comprises a conducting coil wrapped around a magnetic member, said conducting coil expanding and contracting in response to a current pulse produced by the laser discharge; said coil motion causing said active fluid to circulate through said discharge chamber means and said channel member.

12. A fluid laser system as recited in claim 10, wherein said electromechanical pumping means comprises a combination bellows means and diaphragm member attached to said second port; and said bellows means expanding and contracting in response to a current pulse produced by the laser discharge; motion of said bellow means causing said active fluid to circulate through said discharge means and said channel member; said diaphram member causing said active fluid to flow only in a direction from said channel member to said discharge chamber means through said second port.

13. A fluid laser system as recited in claim 10, wherein said electromechanical pumping means comprises a tubular diaphram means, disposed inside a conducting tube; said tubular diaphram expanding and contracting in response to a current pulse produced by the laser discharge; motion of said tubular diaphram means causing said active fluid to circulate through said discharge chamber means and said channel member.

14. A fluid laser system as recited in claim 10, wherein said channel member defines a return flow path for said active fluid, and further comprising filter means for cleaning said active fluid, said filter means being disposed in said return flow path of said active fluid.

15. A fluid laser system, comprising:

(a) discharge chamber means for defining an interior volume having an optical axis and first and second ports;

(b) first and second reflective members defining a resonant cavity with an optical axis;

(c) reservoir chamber means for defining an interior volume having third and fourth ports positioned at opposing ends of said reservoir chamber means said ports communicating with said interior volume;

(d) first channel means extending between said first port and said fourth port for putting said discharge chamber means in communication with said reservoir chamber means;

(e) second channel means extending between said second port and said third port for putting said discharge means in communication with said reservoir chamber means;

(f) an active fluid disposed throughout said discharge chamber means, said reservoir chamber means and said first and second channel means;

(g) an excitation system comprising an electrode system and a high voltage supply coupled to said electrode system;

(h) first valve means for permitting flow of said fluid in said first channel means only in a direction from said discharge chamber means to said reservoir chamber means;

(i) second valve means associated with said second channel means for permitting flow of said fluid only in a direction from said reservoir chamber means to said discharge chamber means; and (j) pumping means associated with said reservoir chamber means for pumping said active fluid; said pumping means being powered by a current pulse produced by the laser discharge.

16. An apparatus as recited in claim 15, wherein said pumping means comprises an electromechanical device disposed external to said reservoir chamber means, and disposed adjacent to a flexible wall of said reservoir chamber means; and said electromechanical device expanding and contracting in response to a current pulse produced by the laser discharge; motion of said electromechanical device causing said flexible wall to push in and thereby causing said active fluid to circulate through said reservoir chamber, said first channel means, said discharge chamber means, and said second channel means.

* * * * *